United States Patent
Jakubiak

(10) Patent No.: US 9,696,616 B2
(45) Date of Patent: Jul. 4, 2017

(54) METHOD AND APPARATUS FOR CONTROLLING FOCUS OF PROJECTOR OF PORTABLE TERMINAL

(71) Applicant: Samsung Electronics Co., Ltd., Gyeonggi-do (KR)

(72) Inventor: Antoni Jakubiak, Grojec (PL)

(73) Assignee: Samsung Electronics Co., Ltd (KR)

( * ) Notice: Subject to any disclaimer, the term of this patent is extended or adjusted under 35 U.S.C. 154(b) by 137 days.

(21) Appl. No.: 14/679,620

(22) Filed: Apr. 6, 2015

(65) Prior Publication Data

US 2015/0288936 A1    Oct. 8, 2015

(30) Foreign Application Priority Data

Apr. 4, 2014   (KR) ........................ 10-2014-0040547

(51) Int. Cl.
| | | |
|---|---|---|
| *G03B 21/53* | (2006.01) | |
| *H04N 9/31* | (2006.01) | |
| *G02B 7/09* | (2006.01) | |
| *G03B 29/00* | (2006.01) | |

(52) U.S. Cl.
CPC ............ *G03B 21/53* (2013.01); *G02B 7/09* (2013.01); *H04N 9/317* (2013.01); *H04N 9/3194* (2013.01); *G03B 29/00* (2013.01)

(58) Field of Classification Search
CPC .......... G02B 7/09; G03B 21/53; G03B 29/00; H04N 9/317; H04N 9/3194
See application file for complete search history.

(56) References Cited

U.S. PATENT DOCUMENTS

| | | |
|---|---|---|
| 4,198,138 A | 4/1980 | Parker et al. |
| 5,803,570 A | 9/1998 | Chen et al. |
| 6,050,690 A | 4/2000 | Shaffer et al. |
| 6,246,446 B1 | 6/2001 | Heimbuch et al. |
| 6,463,220 B1 | 10/2002 | Dance et al. |
| 6,483,555 B1 | 11/2002 | Thielemans et al. |
| 6,618,076 B1 | 9/2003 | Sukthankar et al. |
| 7,001,023 B2 | 2/2006 | Lee et al. |
| 7,092,028 B2 | 8/2006 | Akutsu |
| 7,110,666 B2 | 9/2006 | Abe et al. |

(Continued)

FOREIGN PATENT DOCUMENTS

| | | |
|---|---|---|
| JP | 2002290818 | 10/2002 |
| JP | 2010-136327 | 6/2010 |
| JP | 2011217403 | 10/2011 |

OTHER PUBLICATIONS

European Search Report dated Oct. 20, 2015 issued in counterpart application No. 15162626.4-1560, 6 pages.

*Primary Examiner* — Sultan Chowdhury
*Assistant Examiner* — Magda Cruz
(74) *Attorney, Agent, or Firm* — The Farrell Law Firm, P.C.

(57) ABSTRACT

Disclosed are a method and an apparatus for controlling the focus of a projector of a portable terminal when the projector is operated. The method includes projecting screen data by enabling an auto-focusing operation of the projector; capturing the projected screen data through the camera, and detecting a change of a value of the captured screen through a sensor; and when the change of the value is greater than a preset threshold value, temporarily stopping the auto-focusing operation of the projector and projecting the screen data.

20 Claims, 15 Drawing Sheets

(56) References Cited

U.S. PATENT DOCUMENTS

| | | |
|---|---|---|
| 7,242,818 B2 | 7/2007 | Beardsley et al. |
| 7,257,273 B2 | 8/2007 | Li et al. |
| 7,519,231 B2 | 4/2009 | Li et al. |
| 7,599,561 B2 | 10/2009 | Wilson et al. |
| 7,639,401 B2 | 12/2009 | Bala et al. |
| 7,677,737 B2 | 3/2010 | Lonn |
| 8,023,996 B2 | 9/2011 | Camp, Jr. |
| 8,031,271 B2 | 10/2011 | Aufranc et al. |
| 8,104,899 B2 | 1/2012 | Ha et al. |
| 8,123,363 B2 | 2/2012 | Nozaki et al. |
| 8,297,757 B2 | 10/2012 | Kubota |
| 2006/0103811 A1 | 5/2006 | May et al. |
| 2010/0103386 A1* | 4/2010 | Kubota ............... H04N 9/3185 353/70 |
| 2011/0025982 A1 | 2/2011 | Takahashi |
| 2011/0216205 A1 | 9/2011 | Flatt et al. |
| 2012/0086924 A1 | 4/2012 | Moon et al. |
| 2012/0154595 A1 | 6/2012 | Sassi |
| 2012/0154663 A1 | 6/2012 | Park et al. |

* cited by examiner

METHOD AND APPARATUS FOR CONTROLLING FOCUS OF PROJECTOR OF PORTABLE TERMINAL

PRIORITY

This application claims priority under 35 U.S.C. §119(a) to Korean Patent Application No. 10-2014-0040547, filed in the Korean Intellectual Property Office on Apr. 4, 2014, the contents of which are incorporated herein by reference.

BACKGROUND OF THE INVENTION

1. Field of the Invention

The present invention relates generally to a method and an apparatus for controlling the focus of a projector in a portable terminal.

2. Description of the Related Art

Due to the rapid growth of digital technologies, portable terminals having various functions have been released. In addition to performing basic functions as calling and texting, such portable terminals includes, for example, a projector and a camera to perform various functions. A portable terminal that includes a projector projects screen data through the projector to display the screen data to a viewing audience.

The projector is an image projecting electronic device by which photos, pictures, and letters on a transparent paper may be enlarged and projected to a screen through a lens. Conventional projectors output images and videos in the form of files to a screen. The user displays images output through the projector to the viewing audience, such as in a seminar or a workshop.

The portable terminal automatically adjusts the focus of the projector during the use of the projector. However, when an abrupt motion or a change in a lighting environment is detected, the auto-focus is limited. Accordingly, there is a need in the art for an improved projector that does not compromise the auto-focus operation.

SUMMARY OF THE INVENTION

The present invention has been made to address at least the above-mentioned problems and/or disadvantages and to provide at least the advantages described below. Accordingly, an aspect of the present invention is to provide a method and an apparatus in which an auto-focusing operation is controlled in response to an abrupt motion or a change in light when the auto-focusing operation is performed by a portable terminal.

In accordance with an aspect of the present invention, there is provided a method of controlling a focus of a projector of a portable terminal, including projecting screen data by enabling an auto-focusing operation of the projector, capturing the projected screen data through the camera, detecting a change of a value of the captured screen through a sensor, and temporarily stopping, when the change of the value is greater than a preset threshold value, the auto-focusing operation of the projector and projecting the screen data.

In accordance with anther aspect of the present invention, there is provided an apparatus for controlling a focus of a projector of a portable terminal, including a projector that projects screen data, a camera that, captures the projected screen data when the screen data is projected by the projector, a sensor unit that detects a change of a value of the screen captured by the camera, and a controller that, during execution of the projector, when the change of the value of the screen is greater than a first preset threshold value, projects the screen data by temporarily stopping an auto-focusing operation of the projector, and when the change of the value of the screen is less than a second preset threshold value, projects the screen data by enabling the auto-focusing operation of the projector.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
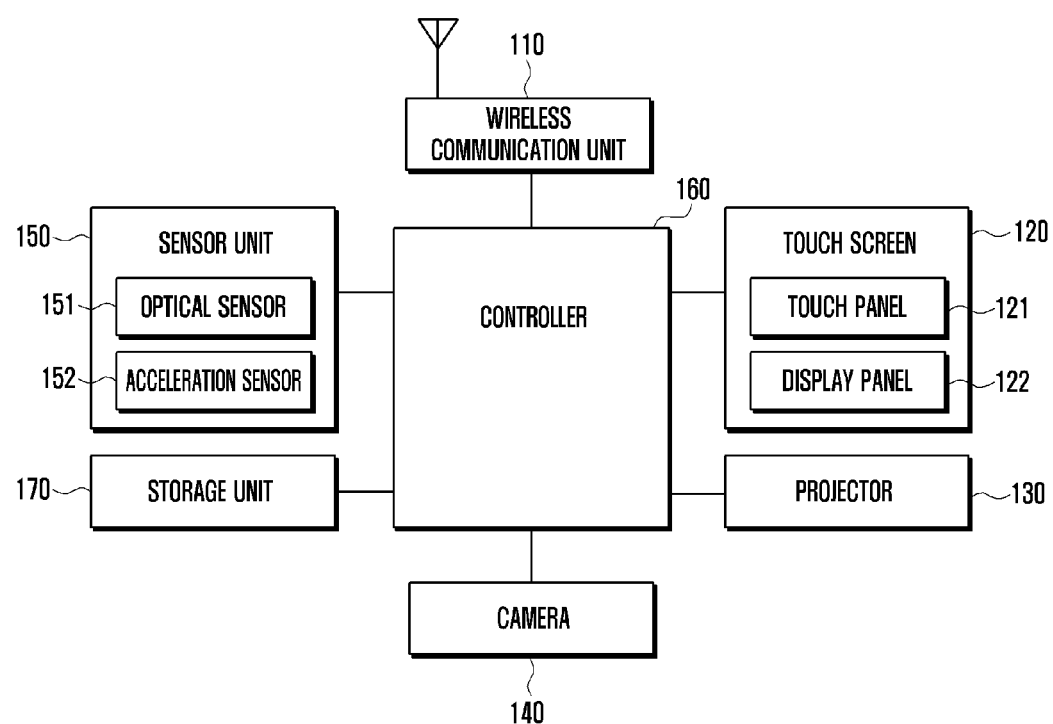
FIG. 1 illustrates a configuration of a portable terminal according to an embodiment of the present invention.

Hereinafter, embodiments of the present invention will be described in detail with reference to the accompanying drawings. It should be noted that the same elements will be designated by the same reference numerals although they are shown in different drawings. Further, a detailed description of known functions and configurations which may make the subject matter of the present invention unclear will be omitted. In the following description, the term "threshold value" refers to a reference value for determination that is used to perform an auto-focusing operation. Although the threshold value is limited to a predetermined range in the following description, the present invention is not limited thereto.

FIG. 1 illustrates a configuration of a portable terminal according to an embodiment of the present invention.

Referring to FIG. 1, the portable terminal includes a wireless communication unit 110, a touch screen 120, a projector 130, a camera 140, a sensor unit 150, a controller 160, and a storage unit 170. The components of FIG. 1 are not essential to the configuration of the portable terminal, and a larger or smaller number of components may be used. For example, when the portable terminal according to an embodiment of the present invention does not support a separate communication function, the wireless communication unit 110 may be omitted.

The wireless communication unit 110 includes at least one module that allows wireless communications between the portable terminal and either a wireless communication system or a network where another portable terminal is located. For example, the wireless communication unit 110 may include a mobile communication module, a Wireless Local Area Network (WLAN) module, a short-range communication module, a location calculating module, and/or a broadcast receiving module.

The touch screen 120 includes a touch panel 121 and a display panel 122. The touch panel 121 detects a user input for enabling a projector, and may be a panel for detecting a touch of a finger of the user and/or detecting a touch of an electronic pen. The display panel 122 may be an LCD or an Organic Light-Emitting Device (OLED). The display panel 122 displays a projected image by enabling the projector.

The projector 130 may be embedded in the portable terminal. When receiving various screen data from the controller 160, the projector 130 outputs the received screen data to the outside through a lens. The projector 130 may enlarge and output screen data through a lens. That is, the projector 130 projects various screen data processed by the controller 160, such as an auto-focused image.

The camera 140 captures an image when a camera mode is executed under the control of the controller 160. In particular, when the projector 130 is executed under the control of the controller 160, the camera 140 captures an image projected through the projector.

The sensor unit 150 includes an optical sensor 151 and an acceleration sensor 152. The optical sensor 151 detects a change in light, and the acceleration sensor 152 detects shaking or movement. The sensor unit 150 may additionally include an illumination intensity sensor for detecting light and movement, a grip sensor, and an UltraViolet (UV) sensor.

A sensor data collection period of the sensor unit 150 may be determined by a request signal transmitted by the controller 160. The sensor data collection period is a time point corresponding to contents of a request signal of the controller 160, and may be set such that data is collected at a predetermined period.

The storage unit 170 includes a program memory and a data memory. The program memory stores an operating program of the portable terminal and the data memory stores data generated during the execution of a program.

In particular, the storage unit 170 may calculate, accumulate, and store a value detected through the sensor unit 150.

The controller 160 controls the overall operation of the portable terminal. When the projector 130 is enabled, the controller 160 determines whether the acceleration sensor 152 for detecting movement is enabled. Thereafter, the controller 160 measures and accumulates a value detected by the acceleration sensor 152. The controller 160 enables the camera 140 that captures an image projected through the projector 130 as the projector 130 is enabled.

The controller 160 then executes an auto-focusing operation, and thereafter, detects whether the auto-focusing operation is stopped. When the auto-focusing operation is not stopped, the controller 160 controls the focus of the projector and calculates an acceleration accumulating value. When the acceleration accumulation value is a greater than or equal to a threshold value, the controller 160 temporarily stops the auto-focusing operation and determines whether the auto-focusing operation is stopped. When determining that the auto-focusing operation is stopped, the controller 160 compares an acceleration accumulation value with a preset threshold value. When the acceleration accumulation value is less than the preset threshold value, the auto-focusing operation is resumed. The controller 160 stops the auto-focusing operation when a time period for stopping the auto-focusing operation is greater than a preset time period.

In a portable terminal including the projector 130, the focus of the projector 130 may be disturbed by movement of the portable terminal and/or a change of ambient light. That is, the focus of the projector 130 may be disturbed when the portable terminal is moved or the lighting environment abruptly changes. In embodiments of the present invention, the portable terminal including the projector 130 discloses a method and an apparatus for automatically compensating for a focus while the focus changes.

In an embodiment of the present invention, when shaking of the portable terminal is detected during an auto-focusing process of the projector, the portable terminal temporarily stops an auto-focusing operation or resumes the auto-focusing operation.

In another embodiment of the present invention, when ambient lighting changes during an auto-focusing process of the projector, the portable terminal temporarily stops an auto-focusing operation or resumes the auto-focusing operation.

In another embodiment of the present invention, when the device is shaken before an auto-focusing process of the projector is enabled, a unit (an auto-focusing button) for enabling an automatic focus compensating system is or is not operated.

In another embodiment of the present invention, when ambient lighting changes before an auto-focusing process of the projector is enabled, a unit for enabling an automatic focus compensating system is or is not operated.

In another embodiment of the present invention, when a backlash, noise of a camera, or hand shaking of the portable terminal occurs, the focus is automatically controlled by performing a unidirectional scanning operation in a focusing range for determining an optimum contrast and setting the focus to an optimum contrast in the same direction as the scanning direction.

In another embodiment of the present invention, when settings of the projector 130 are enabled or disabled, the camera is enabled in advance by increasing the auto-focusing speed.

In the first embodiment, when the portable terminal is shaken in the auto-focusing process of the projector 130, a calculation for auto-focusing cannot be accurately performed. For example, when the device is rapidly moved while being gripped by a hand during the auto-focusing process, the device may be shaken. When the projector 130 is driven by enabling the auto-focusing function, the controller 160 projects an image through the projector 130. The controller 160 may make a control such that the camera 140 captures the projected image and the acceleration sensor 152 measures the acceleration (for example, shaking, movement, and the like) of the portable terminal. Then, the controller 160 executes an auto-focusing operation of controlling the focus of the projector, and performs a process of temporarily stopping or resuming the auto-focusing operation when shaking of the portable terminal is detected.

Then, while the controller 160 performs an auto-focusing process, the acceleration sensor 152 measures the acceleration of the portable terminal. The acceleration sensor 152 transmits the measured acceleration to the controller 160, and the controller 160 accumulates the measurement result. When the value accumulated while the auto-focusing operation is executed exceeds a first threshold value, the controller 160 temporarily stops the auto-focusing operation. When the value accumulated while the auto-focusing operation is temporarily stopped is less than a second threshold value, the controller 160 resumes the auto-focusing operation. However, when the time period for which the auto-focusing operation is temporarily stopped is greater than a predetermined time period, the controller 160 completes the auto-focusing operation.

Figure 2:
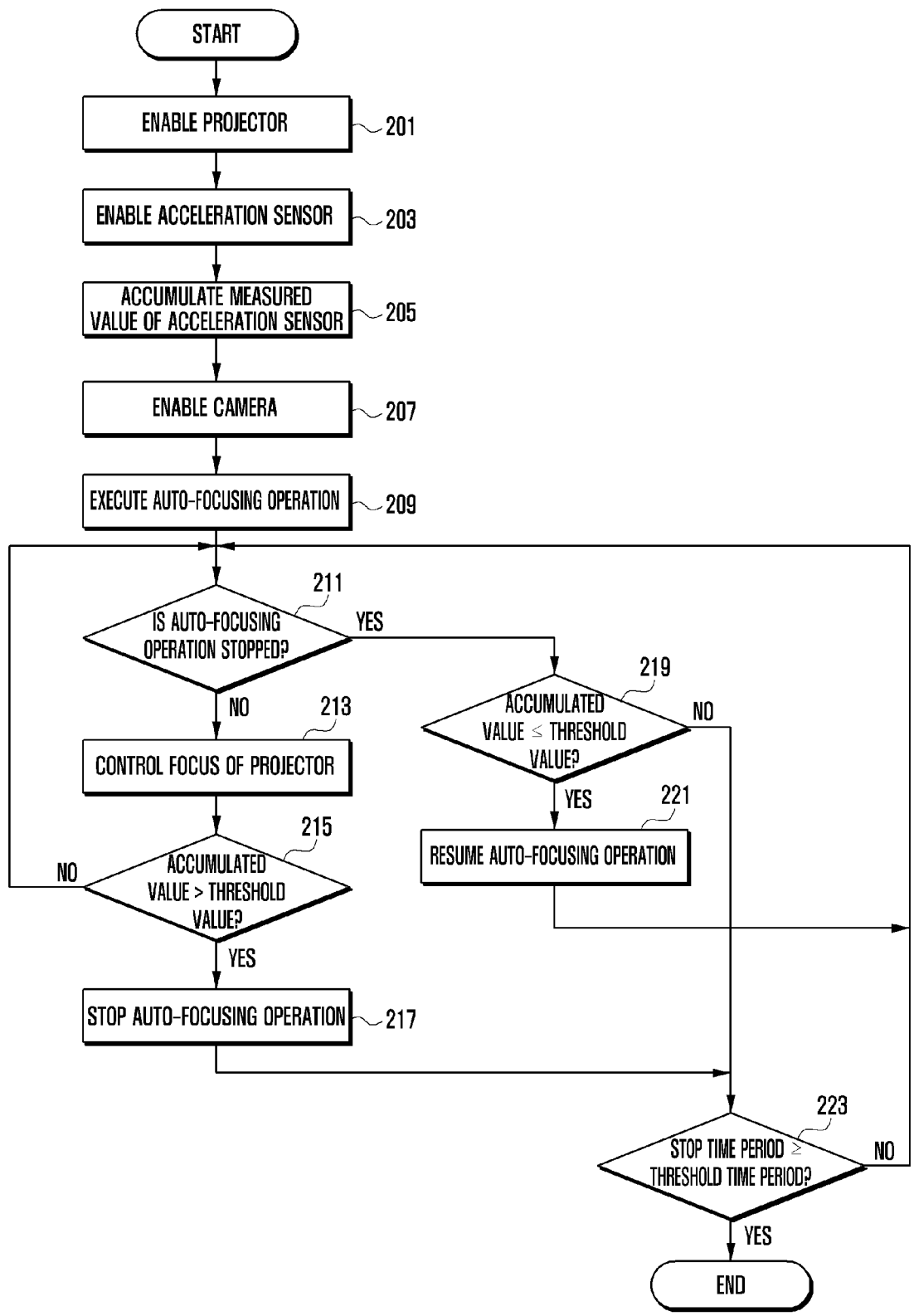
FIG. 2 illustrates a procedure of controlling an auto-focusing operation by an acceleration sensor in a portable terminal according to an embodiment of the present invention.
Figure 3:
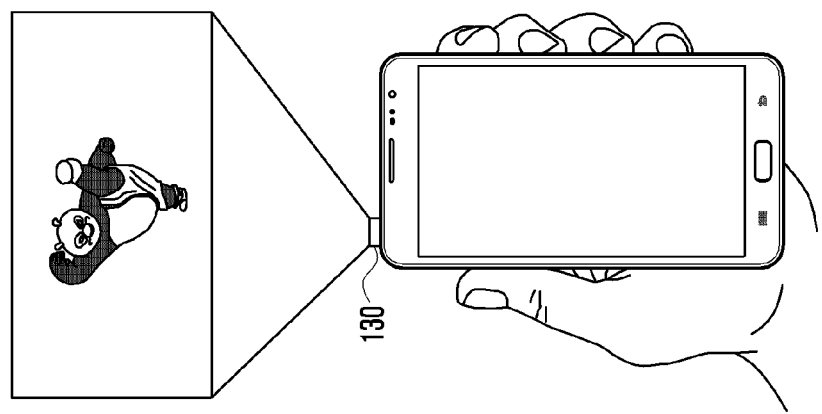
FIG. 3 illustrates an example of a screen of controlling an auto-focusing operation by an acceleration sensor in a portable terminal according to an embodiment of the present invention.
Figure 3:
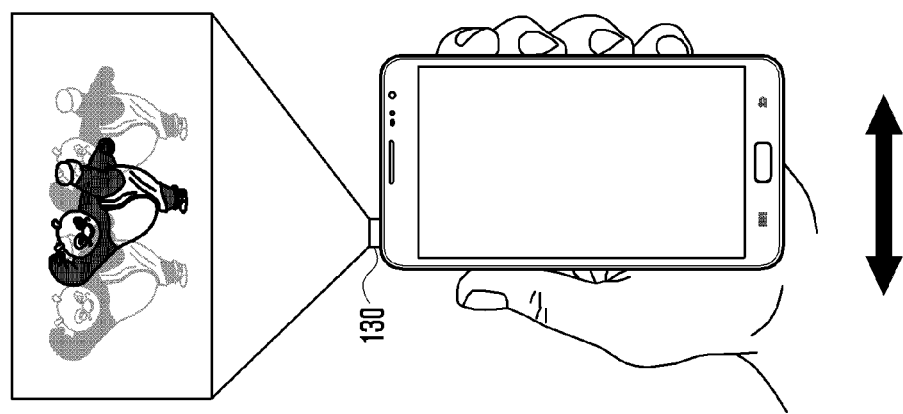

FIG. 2 illustrates a procedure of controlling an auto-focusing operation by an acceleration sensor in a portable terminal according to an embodiment of the present invention. FIG. 3 illustrates an example of a screen of controlling an auto-focusing operation by an acceleration sensor in a portable terminal according to an embodiment of the present invention.

Referring to FIGS. 2 and 3, when the projector 130 for projecting screen data is enabled, the controller 160 detects the enabling of the projector 130 in step 201. When the enabling of the projector 130 is detected, the controller 160 determines enabling of the acceleration sensor 152 according to the enabling of the projector 130 in step 203. Thereafter, the controller 160 calculates the acceleration according to movement of the portable terminal through the acceleration sensor 152, and accumulates the calculated acceleration in step 205. The accumulated acceleration value A is measured using the following Equation (1). The measured value for n is M.

$$An = \begin{cases} \dfrac{\alpha An + \beta |Mn|}{\alpha + \beta}, & n > 1 \\ |Mn|, & n = 1 \end{cases} \quad (1)$$

The controller 160 enables the camera 140 in step 207. The camera 140 is executed during the execution of the projector 130, and captures screen data projected by the projector 130. Thereafter, the controller 160 executes an auto-focusing operation in step 209.

FIG. 3 illustrates a screen for controlling an auto-focusing operation by the acceleration sensor 152 in the portable terminal. Referring to FIGS. 2 and 3, when the acceleration calculated by the acceleration sensor 152 is greater than a preset threshold value for enabling an auto-focusing operation, the controller 160 executes an auto-focusing operation, during which time the controller 160 determines whether the auto-focusing operation is stopped in step 211.

When the controller 160 determines in step 211 that the auto-focusing operation is not stopped, the focus of the projector 130 is controlled in step 213, and the method of controlling the focus of the projector 130 is performed according to the method of FIG. 10, as described below. The controller 160 determines whether the accumulated acceleration value is greater than a preset threshold value in step 215. The threshold value is for performing a focus controlling process of enabling or disabling the auto-focusing operation. When the accumulated acceleration value is greater than the threshold value, the controller 160 temporarily stops the auto-focusing operation in step 217. Thereafter, the controller 160 determines whether the time period for which the auto-focusing operation is temporarily stopped is greater than a preset threshold time period in step 223. When the time for which the auto-focusing operation is temporarily stopped is greater than the threshold time period, the controller 160 makes this determination and completes the auto-focusing operation in step 223. When the time for which the auto-focusing operation is temporarily stopped is less than or equal to the threshold time period, the process returns to step 211.

When is the controller 160 determines in determination step 211 that the auto-focusing operation is stopped, the controller 160 calculates and accumulates a change in acceleration and determines whether the accumulated acceleration value is equal to or less than a preset threshold value in step 219. When the accumulated acceleration value is equal to or less than the threshold value, the controller 160 makes this determination in step 219 and resumes the auto-focusing operation in step 221. When the accumulated acceleration value is greater than the threshold value, the process proceeds to step 223, as described above.

The controller 160 temporarily stops the auto-focusing operation and resumes the auto-focusing operation when a movement occurs while the projector 130 performs an auto-focusing operation. When the projector 130 is enabled, the controller 160 determines the enabling of the acceleration sensor 152, calculates and accumulates the acceleration measured using the acceleration sensor 152, and captures screen data projected by enabling the camera 140.

The above process may be executed when screen data is projected by the projector 130, and may be a sequential process. Thereafter, the controller 160 performs steps 219-223, as previously described.

In another embodiment of the present invention, if an abrupt change in light occurs in the auto-focusing process, the auto-focusing operation can be accurately performed. For example, the light change may occur if an interior lighting unit is switched on during the auto-focusing process. When the auto-focusing operation is executed, the projector 130 projects screen data that is captured by the camera 140, and the optical sensor 151 measures an intensity of light in an environment where the portable terminal is operated. The controller 160 performs an auto-focusing operation of controlling the focus of the projector 130, and may temporarily stop or resume the auto-focusing operation according to a change of ambient light.

When the auto-focusing operation is executed, the controller 160 measures the intensity of light through the optical sensor 151. The controller 160 calculates a change of intensity of light through the optical sensor 151. If a change in light exceeds a first predefined threshold value while the auto-focusing operation is executed, the controller 160 temporarily stops the auto-focusing operation. If a change in light is less than a second predefined threshold value while the auto-focusing operation is temporarily stopped, the controller 160 resumes the auto-focusing operation. When the time period for which the auto-focusing operation is temporarily stopped is greater than a predetermined time period, the controller 160 completes the auto-focusing operation.

Figure 4:
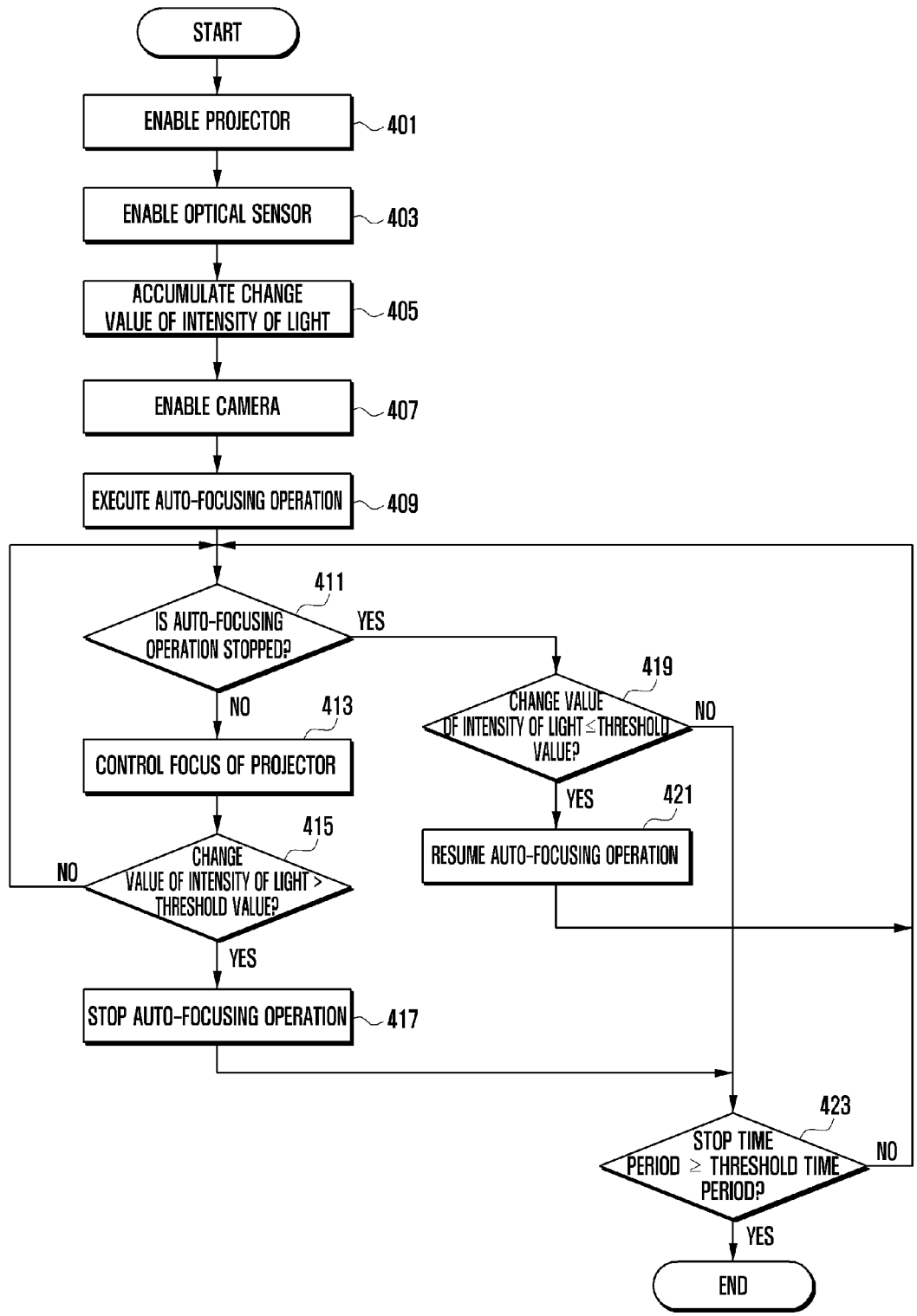
FIG. 4 illustrates a procedure of controlling an auto-focusing operation by an optical sensor in a portable terminal according to an embodiment of the present invention.

FIG. 4 illustrates a procedure of controlling the auto-focusing operation by an optical sensor in a portable terminal according to an embodiment of the present invention.

Referring to FIG. 4, the controller 160 determines whether the projector is enabled in step 401. When the projector 130 is enabled, the controller 160 enables the optical sensor 151 in step 403, and the optical sensor 151 measures the intensity of light in an environment where the portable terminal is operated. The controller 160 calculates and accumulates a change in the intensity of light in step 405.

In a first method of calculating a change in light while the auto-focusing method is executed, a change in light is determined with reference to a difference between a maximum value and a minimum value measured through the optical sensor 151. Thereafter, the controller 160 enables the camera 140 in step 407, during the execution of the projector 130, and screen data projected by the projector 130 is captured. Thereafter, the controller 160 executes an auto-focusing operation in step 409.

While the auto-focusing operation is executed, the controller 160 determines whether the auto-focusing operation is stopped in step 411. If the auto-focusing operation is not stopped, the controller 160 controls the focus of the projector in step 413, and the method of controlling the focus of the projector is performed according to the method of FIG. 10, as described below. When the focus of the projector is controlled, the image projected by the projector 130 is captured by the camera 140. The controller 160 determines a change of light for screen data (frames) captured by the camera 140. When the intensity of light is changed by the optical sensor 151, the controller 160 calculates the change of intensity of light through the optical sensor 151. The controller 160 determines whether the changed value of light intensity is greater than to a preset threshold value in step 415. When the accumulated value according to the change of the value of light intensity is greater than or equal to a preset threshold value, the controller 160 temporarily stops the auto-focusing operation in step 417. Even while the auto-focusing operation is temporarily stopped, the controller 160 calculates a change in light intensity and accumulates the calculated value.

In another method, the change in light intensity is calculated while the auto-focusing operation is temporarily stopped with reference to a difference between absolute values of the current measured value and the previous measured value. Thereafter, the controller 160 determines whether the time period for which the auto-focusing operation is stopped is greater than a preset time period in step 423. When the time period for which the auto-focusing operation is stopped is greater than the preset time period in step 423, the controller 160 makes this determination and completes the auto-focusing operation. When the auto-focusing operation is resumed within a threshold time period, the process returns to before step 411. Thereafter, when stopping the auto-focusing operation is detected in step 411, the controller 160 determines whether the change in the intensity of light is equal to or less than a second preset threshold value in step 419. When the change in the intensity of light is equal to or less than the threshold value, the controller 160 controls such that the auto-focusing operation is resumed in step 421 and returns to step 411.

As described above, the controller 160 addresses a problem arising from an abrupt change in light intensity during the auto-focusing process, as this change in light intensity hampers the calculations necessary for the auto-focusing operation. For example, the change in light may occur when the interior is lighted during the auto-focusing operation. Accordingly, when a change in intense light is detected while the auto-focusing operation is performed, the auto-focusing method is controlled by temporarily stopping or resuming the auto-focusing operation.

When the projector 130 is enabled, the controller 160 enables the optical sensor 151 and the camera 140. The optical sensor 151 measures the intensity of light in an environment where the portable terminal is operated. The camera 140 captures screen data projected by the projector 130. The controller 160 calculates and accumulates a change in light detected by the optical sensor 151. The auto-focusing operation is temporarily stopped or resumed by comparing the accumulated change of light to a preset threshold value.

When the accumulated change of light is greater than or equal to a preset threshold value, the controller 160 temporarily stops the auto-focusing operation. When the accumulated change of light is less than or equal to a preset threshold value while the auto-focusing operation is temporarily stopped, the controller 160 resumes the auto-focusing operation. When the time period for which the auto-focusing operation is stopped is greater than or equal to the preset threshold time period, the controller 160 completes the auto-focusing operation.

Figure 5:
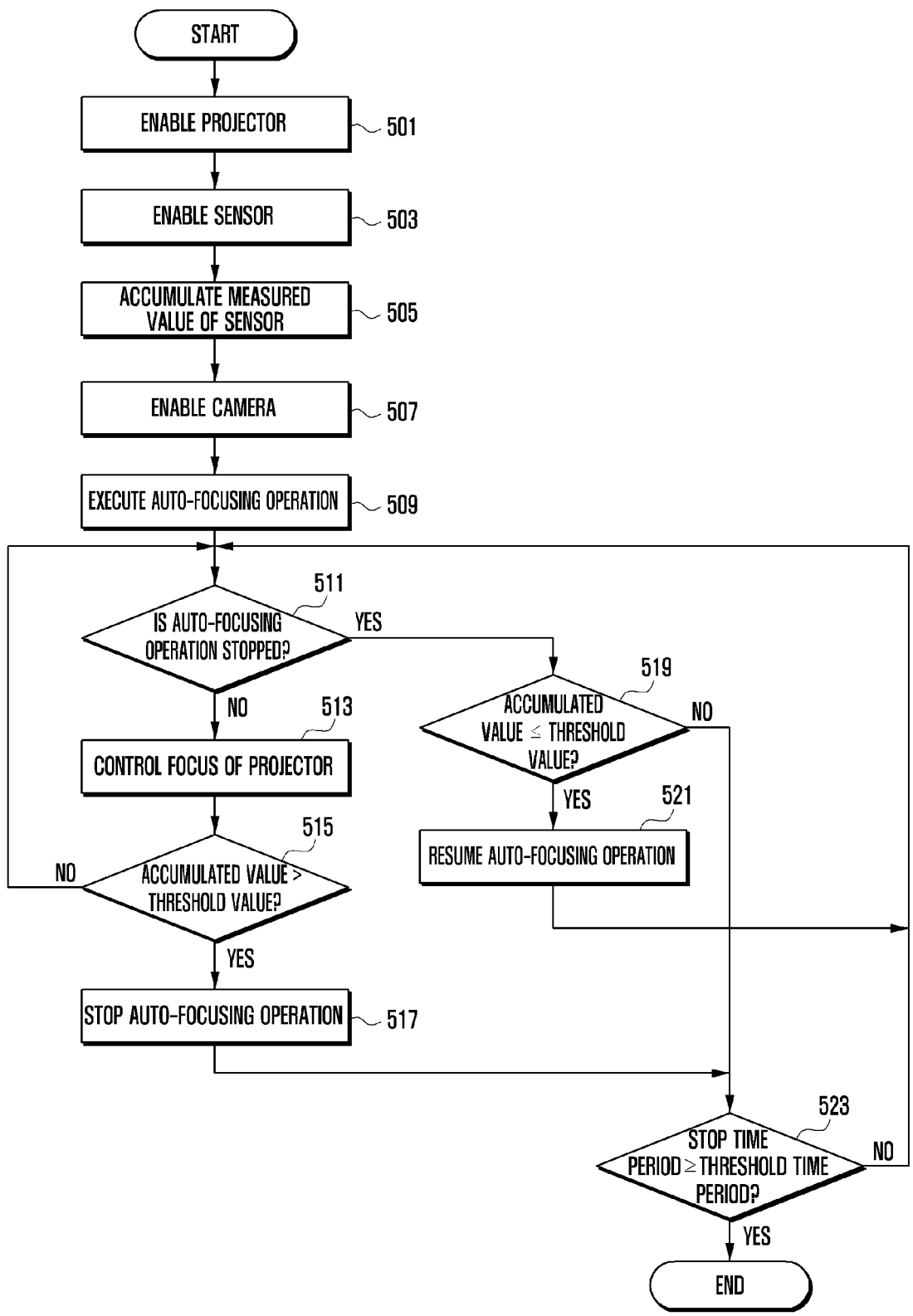
FIG. 5 illustrates a procedure of controlling an auto-focusing operation by an acceleration sensor and an optical sensor in a portable terminal according to an embodiment of the present invention.

FIG. 5 illustrates a procedure of controlling an auto-focusing operation by an acceleration sensor and an optical sensor in a portable terminal according to an embodiment of the present invention.

Referring to FIG. 5, the controller 160 enables the projector 130 in step 501. The projector 130 projects screen data under the control of the controller 160. As the projector 130 is enabled, the controller 160 enables the sensor unit 150 in step 503. The enabled sensor unit 150 detects an acceleration (motion) and the intensity of light, and the controller 160 calculates the detected value and accumulates the calculated value in step 505.

As the projector 130 is enabled, the controller 160 enables the camera 140 in step 507. The camera 140 captures screen data projected by the projector 130. Thereafter, the controller 160 executes an auto-focusing operation in step 509. Thereafter, the controller 160 determines whether the auto-focusing operation is stopped in step 511. When determining that the auto-focusing operation is stopped, the controller 160 compares an accumulated value calculated by the sensor unit 150 with a preset threshold value in step 519. When the accumulated value is less than the preset threshold value, the controller 160 resumes the auto-focusing operation in step 521. Thereafter, the controller 160 returns to step 511 and re-determines whether the auto-focusing operation is stopped. When determining that the auto-focusing operation is not stopped, the controller 160 controls the focus of the projector in step 513, as will be described below with reference to FIG. 10.

When the auto-focusing operation is not stopped, the controller 160 continuously accumulates a value detected by the sensor unit 150. During execution of the auto-focusing operation, the controller 160 compares a value calculated and accumulated by the sensor unit 150 with the preset threshold value. When the accumulated value is greater than the threshold value, the controller 160 makes this determination in step 515 and temporarily stops the auto-focusing operation in step 517. Thereafter, the controller 160 compares the time period for which the auto-focusing operation is stopped with the preset time period in step 523. When the time period for which the auto-focusing operation is stopped is less than the preset time period, the process returns to step 511. When the time period for which the auto-focusing operation is stopped is greater than or equal to the preset time, the controller 160 ends the auto-focusing operation.

In another embodiment, when the portable terminal is shaken before the auto-focusing process is enabled, the portable terminal including the projector 130 may control the auto-focusing operation. That is, because the shaking of the device hampers a calculation necessary for the auto-focusing operation, the auto-focusing operation may not be performed when the device is not in a very stable position. For example, the device may be shaken when the auto-focusing operation is enabled after the device is gripped by a hand and is rapidly moved. In this situation, it may be displayed that the auto-focusing operation cannot be enabled when the device is moved.

The touch screen 120 displays a GUI (Graphic User Interface) and may receive a user input. The GUI includes a projector setting window which provides GUI elements including an auto-focusing button and a manual focusing slider. The controller 160 executes a method of controlling the state of the auto-focusing button by the acceleration sensor 152. In the method, one of an enabled state and a disabled state of the auto-focusing button is selected. The enabled state and the disabled state may be displayed in another graphic. When the enabled state of the button is selected, the controller 160 executes an auto-focusing function in response to a user input related to the auto-focusing button. The auto-focusing function is operated on an image captured by the camera 140, and the focus of the projector 130 may be controlled such that a projected image has an optimum resolution and the focus of the projector 130 may manually controlled in response to the user input related to the manual focusing slider.

While the projector setting window is displayed on the display panel 122, the acceleration sensor 152 measures the acceleration of the portable terminal and the controller 160 accumulates the measurement result. When the accumulated result is greater than or equal to a first predefined threshold value, the controller 160 selects a disabled state of the auto-focusing operation, and when the accumulated result is less than a second predefined threshold value, the enabled state of the auto-focusing operation is selected.

Figure 6:
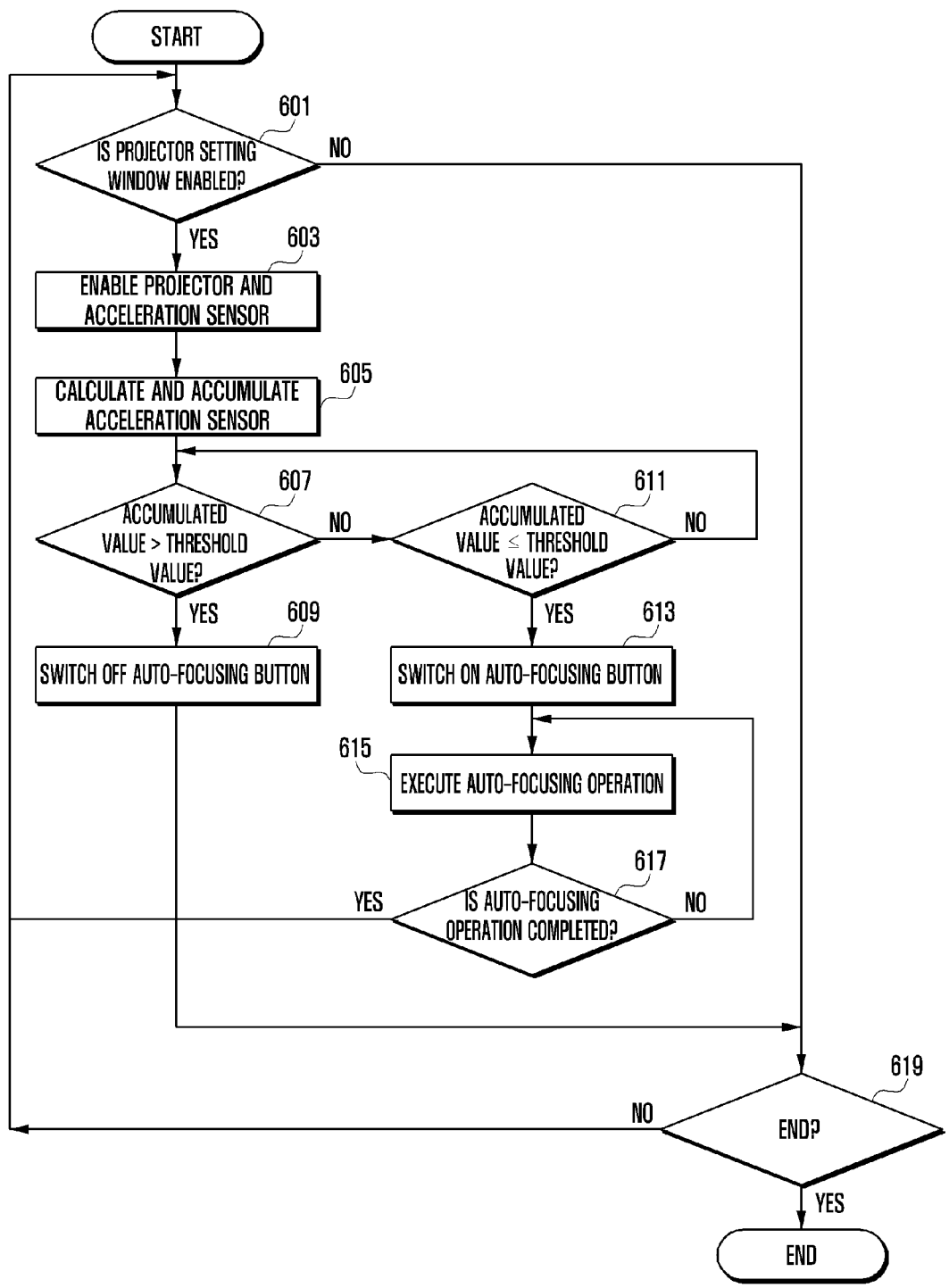
FIG. 6 illustrates a procedure of controlling the state of an auto-focusing button by an acceleration sensor according to an embodiment of the present invention.
Figure 7:
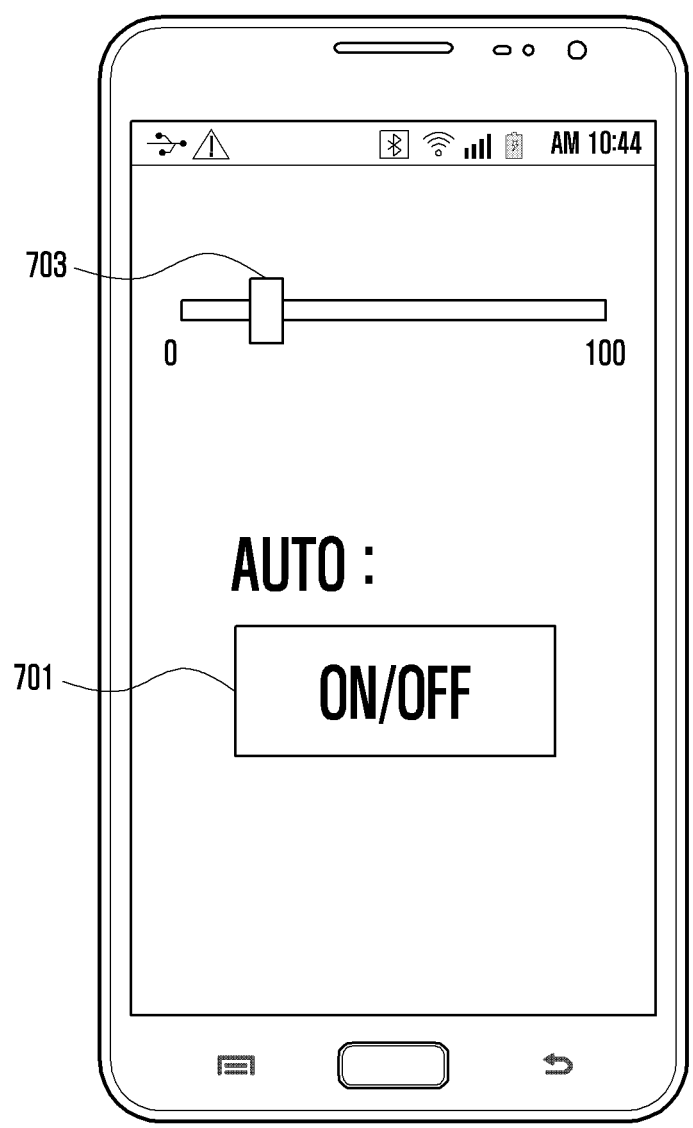
FIG. 7 illustrates an example of a projector setting window according to an embodiment of the present invention.

FIG. 6 illustrates a procedure of controlling a state of an auto-focusing button by an acceleration sensor according to an embodiment of the present invention. FIG. 7 illustrates an example of a projector setting window according to an embodiment of the present invention.

Referring to FIGS. 6 and 7, the controller 160 determines whether the projector setting window is enabled, as in FIG. 7, in step 601. FIG. 7 is an example of the projector setting window, and the projector setting window includes an auto-focusing button 701 and a manual focusing slider 703. When the auto-focusing button 701 is switched on (enabled), the controller 160 executes the auto-focusing operation in response to a user input related to the auto-focusing button 701. When the auto-focusing button 701 is switched off (disabled), the controller 160 executes the auto-focusing operation in response to a user input related to the manual focusing operation. The screen may be displayed in different graphics according to the on/off state of the auto-focusing button 701.

When the projector setting window is enabled, the controller 160 enables the projector and the acceleration sensor 152 in step 603. While the acceleration projector setting window is displayed, the controller 160 calculates an acceleration detected by the acceleration sensor 152 and accumulates the calculated acceleration in step 605. In step 607, when it is determined that the accumulated acceleration value is greater than a preset threshold value, the controller 160 controls such that the auto-focusing button is switched off. When the auto-focusing button is switched off, the controller 160 does not execute the auto-focusing function. When determining in step 611 that the accumulated acceleration is less than or equal to a preset threshold value, the controller 160 switches on the auto-focusing button 701 in step 613, and executes the auto-focusing operation in step 615. Then, the auto-focusing operation is executed according to the method of FIG. 10, as described below. Thereafter, the controller 160 returns to step 615 to perform the auto-focusing operation until the completion of the auto-focusing operation is detected, in step 617. When the completion of the auto-focusing operation is detected, the controller 160 returns to step 601 to perform a method of controlling a state of the auto-focusing button 701 through the foregoing process. If enabling of the projector setting window is not detected in step 601, the controller 160 completes an operation of the projector in step 619.

As described above, the controller 160 controls according to a shaking (moving) of the projector before the auto-focusing function is started (enabled). When shaking corresponding to greater than or equal to a threshold value is detected, the controller 160 does not start an auto-focusing operation. For example, when the auto-focusing operation is enabled after the portable terminal is gripped by a hand and is moved rapidly, the device may be shaken. In this situation, the controller 160 displays that the portable terminal cannot enable the auto-focusing function to the user through the projector setting window. The controller 160 executes a method of controlling a state of the auto-focusing button by the acceleration sensor 152. The controller 160 selects one of an enabled state and a disabled state, both of which are displayed in another graphic.

When the enabled state of the auto-focusing button is selected, the controller 160 executes an auto-focusing function in response to a user input related to the auto-focusing button. The auto-focusing function is operated on an image captured by a camera, and the focus of the projector is controlled such that a projected image has an optimum resolution. The controller 160 controls the focus of the projector in response to a user input for performing an manual focusing operation, and may manually control the focus through the manual focusing slider.

In another embodiment, an auto-focusing operation is controlled when a change in ambient light occurs before an auto-focusing process is enabled in a portable terminal including the projector 130. A strong light intensity environment may hamper the auto-focusing process, and in particular, may compromise the reliability of a calculation of a contrast of the projected image for the auto-focusing process. When the projection is made bright by external light and the intensity of external light is considerably high as compared with the intensity of the projection, a strong light intensity environment can be created. Such may be determined in an approximate manner using the optical sensor 151 and the auto-focusing operation can be prevented.

The touch screen 120 displays a GUI and receives a user input. The GUI includes a projector setting window that provides GUI elements including an auto-focusing button and a manual focusing slider. The controller 160 executes a method of controlling a state of the auto-focusing button by the optical sensor 151, in which method one of an enabled state and a disabled state of the auto-focusing button is selected. The enabled state and the disabled state may be displayed in another graphic. When the enabled state of the button is selected, the controller 160 executes an auto-focusing function in response to a user input related to the auto-focusing button. The auto-focusing function is operated on an image captured by the camera 140, and the focus of the projector is controlled such that a projected image has an optimum resolution and the focus of the projector may be manually controlled in response to the user input related to the manual focusing slider.

While the setting window of the projector 130 is displayed, the optical sensor 151 measures the intensity of light and the controller 160 accumulates the measurement result. When the accumulated result is greater than a first predefined threshold value, the controller 160 selects a disabled state, and when the accumulated result is less than or equal to a second predefined threshold value, an enabled state is selected such that the state of the auto-focusing button is controlled.

Figure 8:
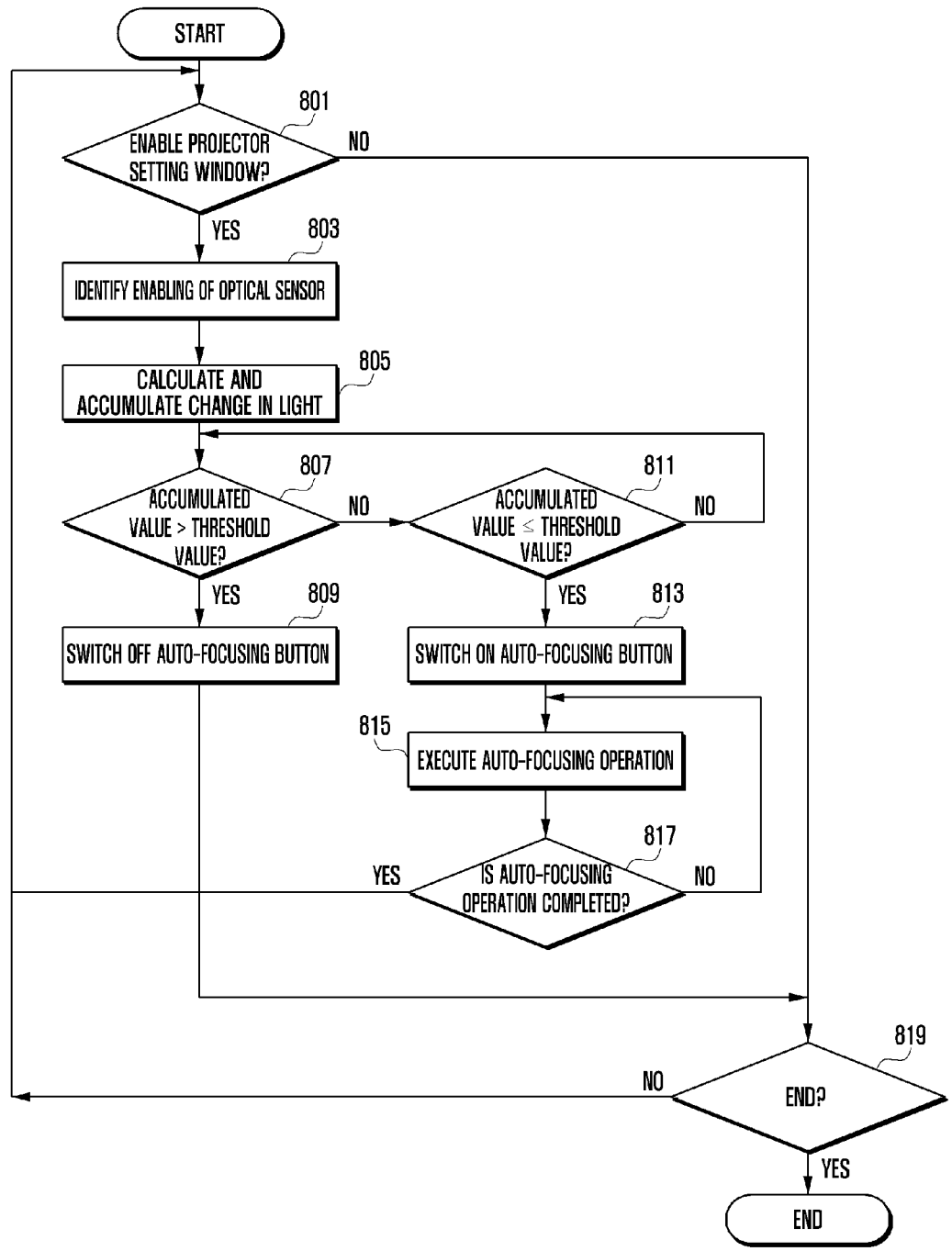
FIG. 8 illustrates a procedure of controlling the state of an auto-focusing button by an optical sensor in a portable terminal according to an embodiment of the present invention.

FIG. 8 illustrates a procedure of controlling the state of the auto-focusing button by an optical sensor in a portable terminal according to an embodiment of the present invention.

Referring to FIG. 8, the controller 160 determines whether to enable the projector setting window in step 801. The projector 130 is executed when determining to enable the projector setting window. The projector setting window includes an auto-focusing button and a manual focusing slide. The controller 160 determines the enabling of the optical sensor 151 in response to the projector 130 in step 803. Thereafter, the controller 160 calculates a change in the detected light and accumulates the calculated value in step 805. The controller 160 compares the accumulated light change with a preset threshold value to determine whether the auto-focusing button is enabled. When the accumulated value is greater than threshold value, the controller 160 makes this determination in step 807, disables (switches off) the auto-focusing button in step 809, and determines whether to end the process in step 819.

When a strong change in light intensity is detected, the controller 160 does not execute an auto-focusing function as the auto-focusing button is disabled. When it is determined that the accumulated value of the optical sensor is less than a second preset threshold value, the controller 160 makes this determination in step 811 and enables (switches on) the auto-focusing button in step 813. When the auto-focusing button is enabled, the controller 160 controls such that the auto-focusing function is performed. When the auto-focusing button is enabled, the controller 160 performs an auto-focusing function in step 815, and the auto-focusing operation may be performed via the process of FIG. 10, as described below. When the auto-focusing operation is completed, the controller 160 makes this determination in step 817 and returns to step 801 to perform the foregoing process.

When the auto-focusing operation is not completed, the controller 160 returns to step 815 to successively perform an auto-focusing operation. When the enabling of the projector setting window is not detected in step 801, the controller 160 determines completion of an operation of the projector 130 in step 819. As described above, the controller 160 determines an environment where strong light intensity is detected, using the optical sensor 151. If strong light intensity is detected, the controller 160 prevents the execution of the auto-focusing operation, since the controller 160 can calculate a contrast having a low reliability in projected screen data when strong light is detected. While the projector setting window is displayed after an operation of the projector is executed, the controller 160 measures the intensity of light through the optical sensor 151 and accumulates the measured result. The state of the auto-focusing button is controlled by comparing the accumulated value with the preset threshold value. When the accumulated value is greater than or equal to a threshold value, the controller 160 switches off (disables) the auto-focusing button. When the accumulated value is less than or equal to a second preset threshold value, the controller 160 performs an auto-focusing function by switching on (enabling) the auto-focusing button. The first threshold value and the second threshold value are arbitrarily set such that a state of the auto-focusing operation button may be controlled, and may be either the same or different. The auto-focusing function is executed on screen data captured by the camera 140, and a focus of the projector is controlled such that the projected screen data may have an optimum resolution.

The controller 160 executes the auto-focusing operation in response to a user input for performing the auto-focusing operation, and the focus of the projector may be manually controlled in response to the user input related to the slider through the manual focusing slider. In this manner, the screen may be displayed in another graphic according to switching on or off of the auto-focusing button.

Figure 9:
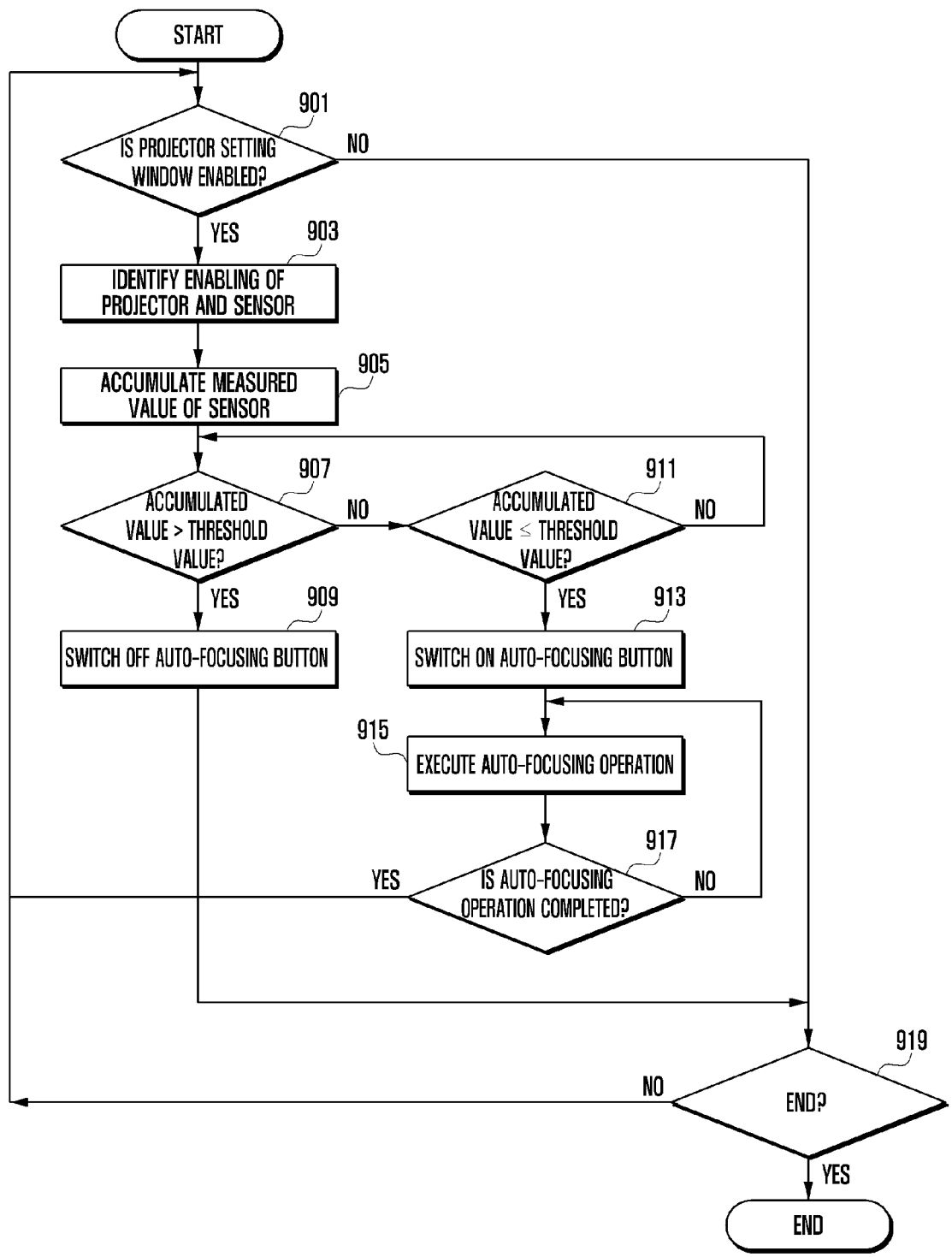
FIG. 9 illustrates a procedure of controlling the state of an auto-focusing button through an acceleration sensor and an optical sensor in a portable terminal according to an embodiment of the present invention.

FIG. 9 illustrates a procedure of controlling a state of an auto-focusing button through an acceleration sensor and an optical sensor in a portable terminal according to an embodiment of the present invention.

Referring to FIG. 9, the controller 160 determines whether the projector setting window is enabled in step 901. When an operation of the projector 130 is executed as in FIG. 7 described above, the projector setting window is a screen on which GUI elements including an auto-focusing button and a manual focusing slider are shown. When the projector setting window is enabled, the controller 160 determines that the projector 130 and the sensor unit 150 are enabled in step 903. While the projector setting window is displayed, the controller 160 accumulates the measurement value detected through the sensor unit 150 in step 905. The controller 160 determines whether the accumulated value is greater than a preset threshold value in step 907. Through the comparison of the accumulated value with the preset threshold value, the controller 160 determines enabling or disenabling of the auto-focusing operation. If it is determined that the accumulated value is greater than or equal to the threshold value, the controller 160 makes this determination in step 907 and disables (switches off) the auto-focusing button in step 909. When the auto-focusing button is disabled, the controller 160 makes controls to disable the auto-focusing operation. When the accumulated value is less than a second preset threshold value, the controller 160 makes this determination in step 911 and enables (switches on) the auto-focusing button in step 913. When the auto-focusing button is enabled (switched on), the controller 160 performs an auto-focusing operation in response to a user input using the auto-focusing button in step 915, and the auto-focusing method is performed in the same manner as the method of FIG. 10, described below.

When the auto-focusing operation is completed in step 917 while the auto-focusing operation is performed, the controller 160 returns to step 901 and resumes a method of controlling a state of the auto-focusing button. Thereafter, the controller 160 controls to complete the operation of the projector when the completion of the projector is required, in step 919.

In another embodiment, an auto-focusing operation hampered by factors such as a backlash, camera noise, and unstable positioning are controlled.

A backlash occurs in a projector focusing mechanism, and it is impossible to determine a backlash in the production process. The backlash may increase during a life cycle of the portable terminal, causing deteriorating reliability in bidirectional scanning for auto-focusing rather than unidirectional scanning.

The images captured by the camera 140 may contain noise substances. The camera noise may be particularly important when captured in the dark. The noise increases according to the distance between the projector and the screen, due to an inaccuracy of a CCD (Charge Coupled Device) sensor of the camera 140. Additionally, noise may increase due to the camera sensor. For example, when a camera sensor employing a 12 bit analog-digital converter is used, a signal is acquired after A/D (Analog/Digital) conversion and packed into an 8 bit grayscale format, which also may cause noise to be introduced.

The device may move while performing an auto-focusing operation. When the motion of the device is substantial, the auto-focusing process may be controlled by the foregoing method in which a change in light is determined with reference to a difference between a maximum value and a minimum value measured through the optical sensor 151. However, when the motion is rather insubstantial, the auto-focusing function may continue when the user desires to safely grip the device. The slight motion of the device may cause a blur in the picture captured by the camera 140. The clearest image is expected in the auto-focusing process, and thus the caused blur may hamper calculation.

The projector 130 projects an image while the auto-focusing operation is set, and the projected image is captured by the camera 140. The controller 160 controls the focus of the projector 130 by setting a focusing value, which may be set within the focusing range between a left value and a right value due to a focus step. The controller 160 processes an image captured by the camera 140, and controls focusing to obtain an optimum focus in the focusing area. The focusing area may be a predefined part of the image captured by the camera 140. It may take time to change the focus for each focus step, which may be set synchronously or asynchronously. In synchronous setting of the focus, processing is temporarily stopped until the focus is set at a desired position. In asynchronous setting of the focus, additional processing continues together with a change in the focus and the current focusing value can be recognized by additional processing.

The auto-focusing method may be executed by a caller in an asynchronous method, and the auto-focusing method may notify the caller that an optimum focus is being sought and auto-focusing is completed. The projector 130 projects a focus pattern, which may be a black and white chess board shape.

Figure 10:
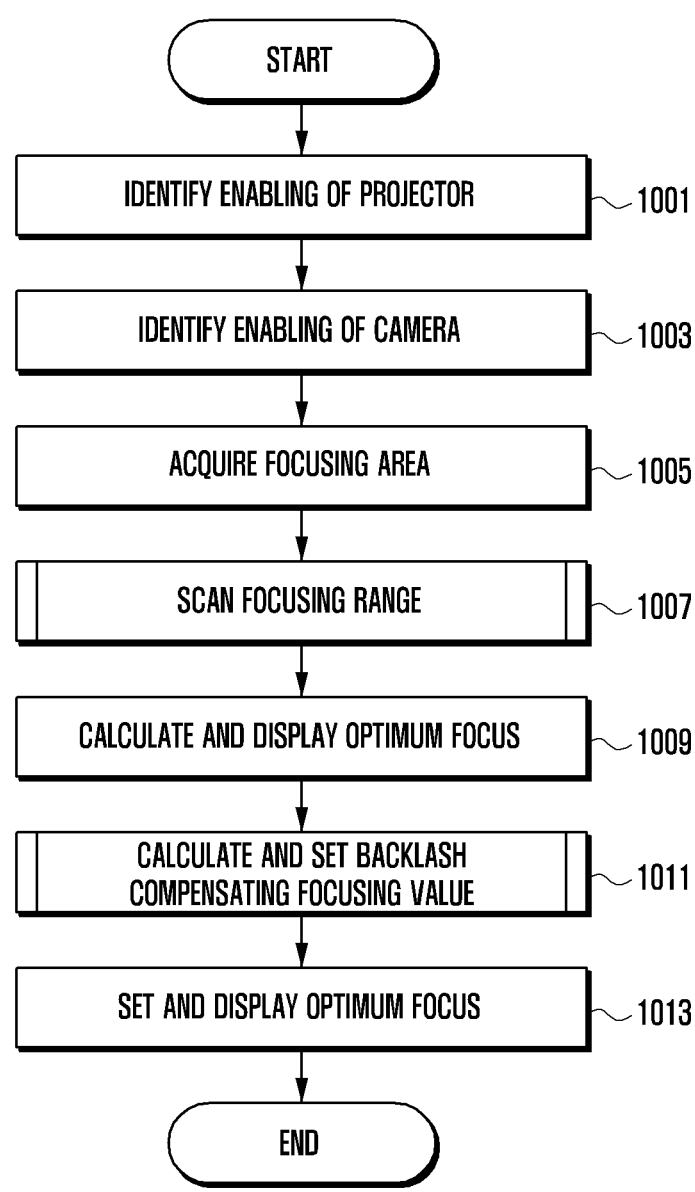
FIG. 10 illustrates a procedure of an auto-focusing method in a portable terminal according to an embodiment of the present invention.

FIG. 10 illustrates a procedure of an auto-focusing method in a portable terminal according to an embodiment of the present invention.

Referring to FIG. 10, the controller 160 determines whether the projector is enabled in step 1001. When the projector is enabled, the controller 160 determines whether the camera 140 is enabled in step 1003. The camera 140 is a fixed focus lens camera, and may share a projector and an optic axis. The camera 140 generally includes several auto-focusing functions, including a camera focus, an exposure, a digital gain, and a white balance. For an improved focusing result, a special control of the auto-focusing function is recommended. The special control includes restraining automatic exposure, restraining auto white balance, and compensating for a digital gain after a focus pattern is displayed and before a focusing range is scanned.

The controller 160 determines whether screen data is captured in a process of determining enabling of the camera 140 in step 1003, and performs a camera control function. When the camera 140 is enabled, the controller 160 captures the projected screen data. When the camera 140 is not enabled, the controller 160 enables the camera 140 to capture the projected screen data. The camera control function is for disabling the automatic exposure function of the camera 140 and disabling the white balance function. After the camera 140 is enabled, the controller 160 acquires a focusing area in step 1005. The focusing area is a predefined part of screen data captured by the camera 140. When the focusing area is acquired, the controller 160 scans a focusing range in step 1007.

Figure 11:
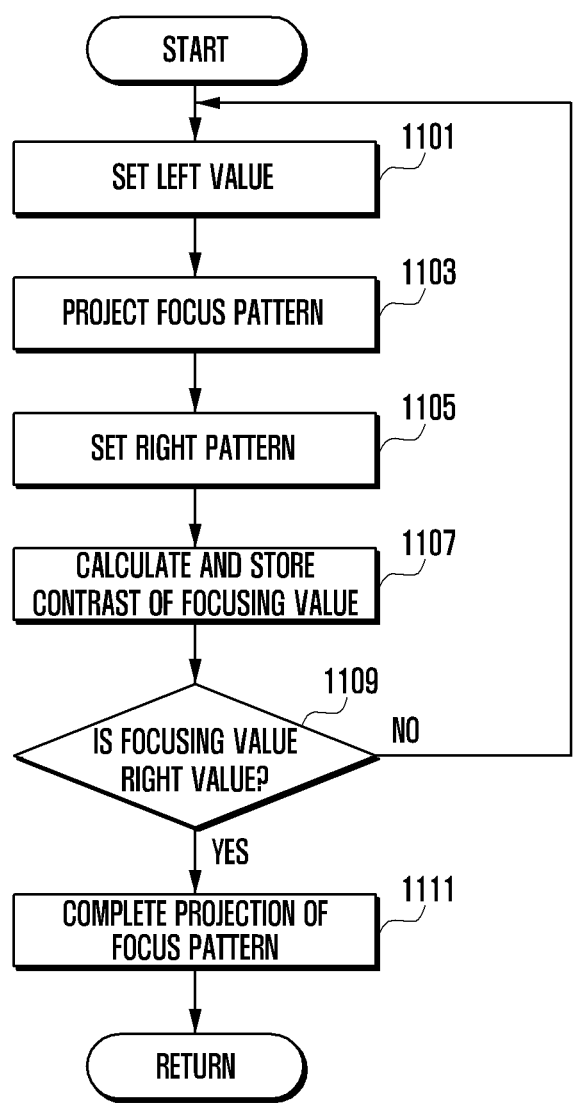
FIG. 11 illustrates a procedure of a method of scanning a focusing range in a portable terminal according to an embodiment of the present invention.

FIG. 11 illustrates a procedure of a method of scanning a focusing range in a portable terminal according to an embodiment of the present invention.

Referring to FIG. 11, the controller 160 synchronously sets a left value of the focusing pattern in step 1101, and projects the focusing pattern through the projector 130 in step 1103. When the focusing pattern is projected, the controller 160 controls digital gain of the camera. When the focusing pattern is projected, the controller 160 asynchronously sets a right value of the focusing pattern in step 1105. When each frame is captured, the controller 160 calculates a contrast of a current focusing value from the focusing area and stores the calculated contrast in step 1107. In a method of calculating a contract of the current focusing value, the controller 160 primarily differentiates the focusing area using a Sobel operator, which is used in a process of processing an image in a periphery direction algorithm. The Sobel operator is a differential operator for calculating a proximate value of an inclination of an image intensity function.

The controller 160 secondarily differentiates the focusing area using the primarily differentiated Sobel operator, and stores an average value of pixels as a contrast in the secondarily differentiated value.

The controller 160 determines whether the current focusing value is a right pattern after the contrast is stored, in step 1109. When the current focusing value is the right pattern, the controller 160 completes the projection of a focus pattern and completes scanning in step 1111. When the current focusing value is not the right value, the process returns to step 1101.

After the focusing range is scanned, the controller 160 calculates and displays an optimum focus in step 1009 of FIG. 10. The process of calculating the optimum focus may be simultaneously performed together with the process of scanning the focusing range. In the optimum focus, the stored contrast has a maximum focusing value when the focusing range is scanned. Thereafter, the controller 160 calculates and sets a backlash compensating focusing value in step 1011. The controller 160 controls to set and display an optimum focus in step 1013.

Figure 12:
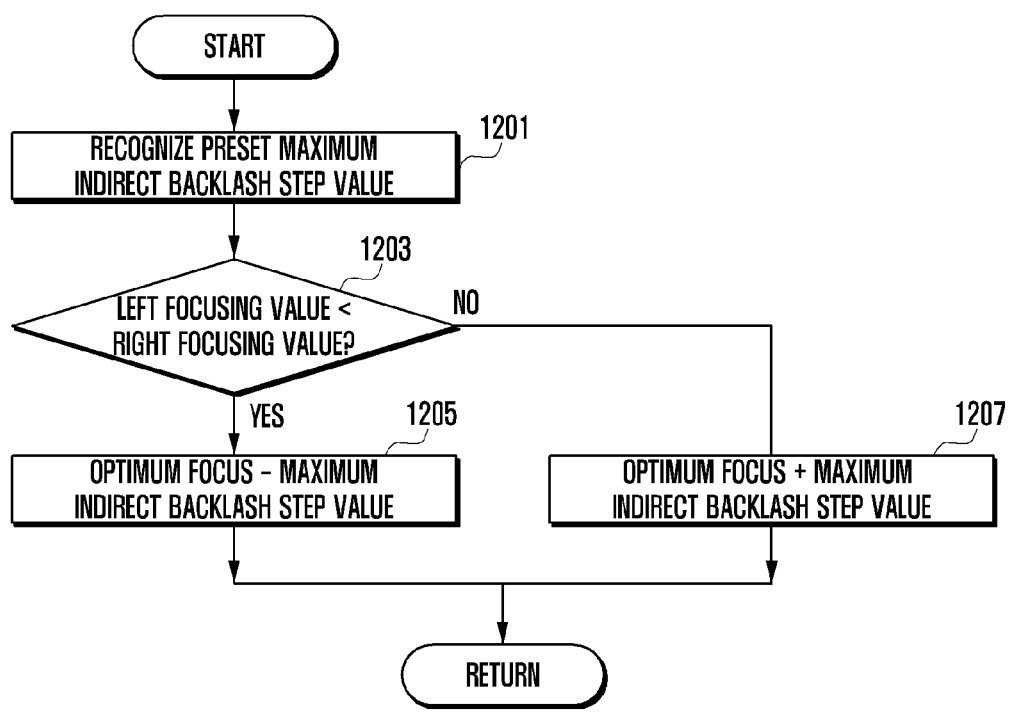
FIG. 12 illustrates a procedure of controlling a backlash compensating focusing value in a portable terminal according to an embodiment of the present invention.

FIG. 12 illustrates a procedure of controlling a backlash compensating focusing value in a portable terminal according to an embodiment of the present invention.

Referring to FIG. 12, the controller 160 recognizes a preset maximum indirect backlash step value in step 1201. The maximum indirect backlash step value is a constant defined in the process of designing a portable terminal, and may be determined in another method. Thereafter, the controller 160 compares the left focusing value with the right focusing value in step 1203. When the left focusing value is less than the right focusing value, the controller 160 subtracts a preset maximum indirect backlash step value from the optimum focusing value in step 1205. When the left focusing value is greater than the right focusing value, the controller 160 adds a preset maximum indirect backlash step value to the optimum focusing value in step 1207.

After setting the backlash compensating focusing value, the controller 160 sets and displays the optimum focus through steps 1201-1207. The controller 160 repeatedly performs the process until the operation of the projector 140 is completed.

For example, assume that the left focusing value is 0, the right focusing value is 50, the optimum focus is 30, and a predefined maximum indirect backlash step is 5. After the scanning of the focusing range is completed, the current focus is set to a correct value of −50, and the backlash compensating focus is calculated: 30−5=25. Thereafter, the backlash compensating focus of −25 is synchronously set. After the backlash compensating focus is set, the optimum focus of −30 is set.

In another embodiment, the problem of an excessive time period that is necessary for enabling the camera 140 can be solved. Before the camera captures a frame that may be used in auto-focusing, approximately one second may be used to enable the camera 140 in the portable terminal. In this embodiment, as the camera is enabled to a background process before an auto-focusing operation is started, the user may not recognize a time period necessary for enabling the camera.

When the auto-focusing operation is executed, the projector 130 projects screen data and the projected screen data is captured by the camera 140. The touch screen 120 displays a GUI and may receive a user input, and includes a setting window of the projector 130. The projector setting window may provide GUI elements, including an auto-focusing button and a manual focusing slider. The portable terminal executes a method of controlling a state of an auto-focusing button related to a state of the camera 140. In the method of controlling a state of the auto-focusing button, a state may be selected form an enabled state and a disabled state, and the enabled state and the disabled state may be displayed in different graphics. When the enabled state of the button is selected, the controller 160 executes an auto-focusing function in response to a user input related to the auto-focusing button. The auto-focusing function is operated on an image captured by a camera 140, and the focus of the projector 130 is controlled such that a projected image has an optimum resolution. The controller 160 may manually control the focus in response to a user input related to the manual focusing slider.

Figure 13:
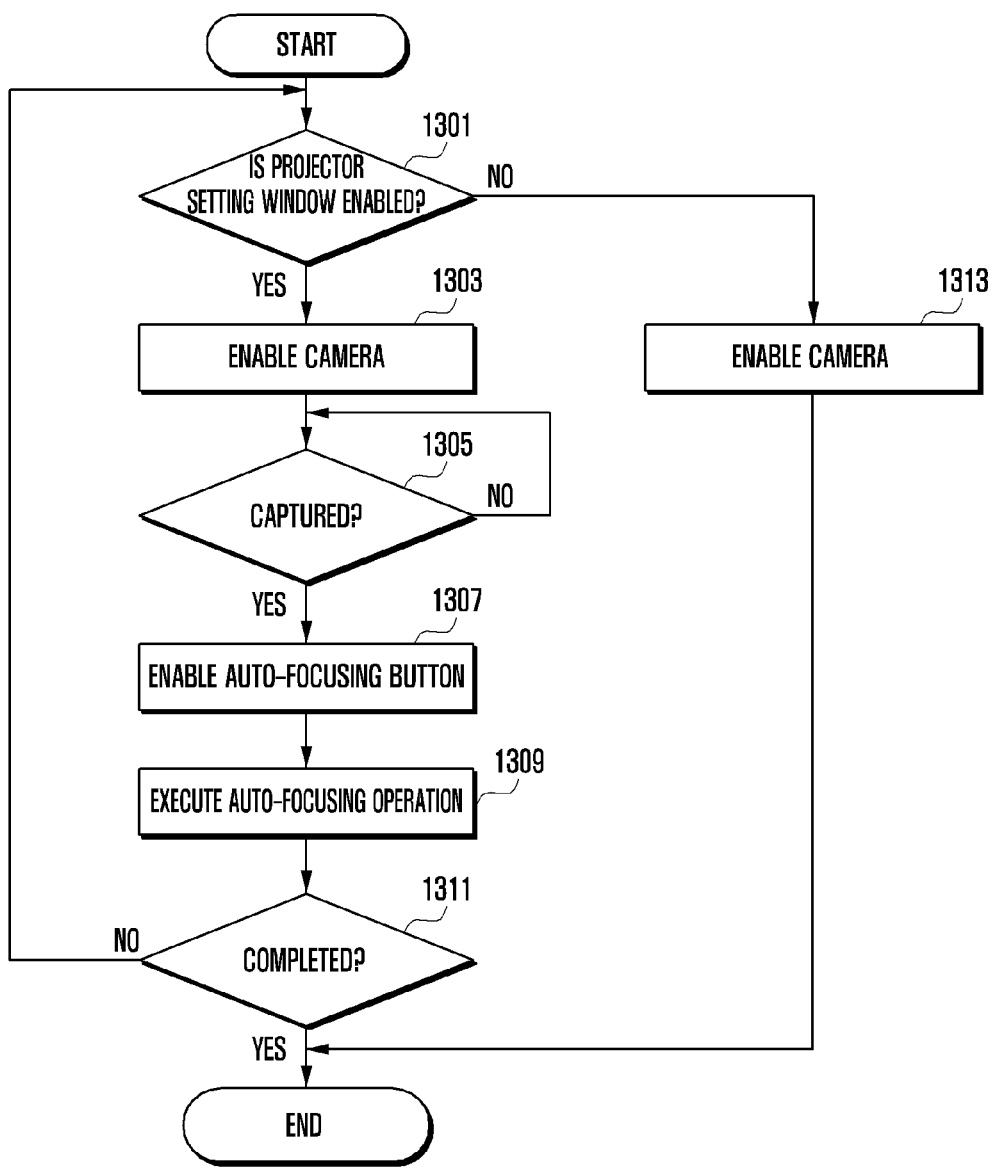
FIG. 13 illustrates a procedure of determining whether a projector is auto-focused according to enabling of a camera in a portable terminal according to an embodiment of the present invention.

FIG. 13 illustrates a procedure of determining whether a projector is auto-focused according to enabling of a camera in a portable terminal according to an embodiment of the present invention.

Referring to FIG. 13, the controller 160 determines whether the setting window of the projector is enabled in step 1301. When an operation of the projector 130 is executed as in FIG. 7, the projector setting window is a screen on which GUI elements including an auto-focusing button and a manual focusing slider. It is assumed that the projector 130 is executed such that the projector setting window is displayed, and an acceleration and a change in light are calculated and accumulated by enabling the sensor unit 150 according to execution of the projector 130. When the projector setting window is not enabled, the controller 160 may disenable the camera 140 in step 1313. Accordingly, when the projector setting window is disabled, the controller 160 may switch off (disable) the auto-focusing button. When the projector setting window is enabled, the controller 160 enables the camera in the background in step 1303. After the camera 140 is enabled in the background, the controller 160 captures an image through the camera 140 in step 1305. The camera 140 performs a function of capturing screen data projected by the projector 130. When the projected screen data is captured, the controller 160 enables the auto-focusing button in step 1307 and executes the auto-focusing operation in step 1309. The method of executing the auto-focusing operation is executed according the process of FIG. 10. Thereafter, the above process is repeatedly performed until completion of the process of projecting screen data is detected.

Figure 14A:
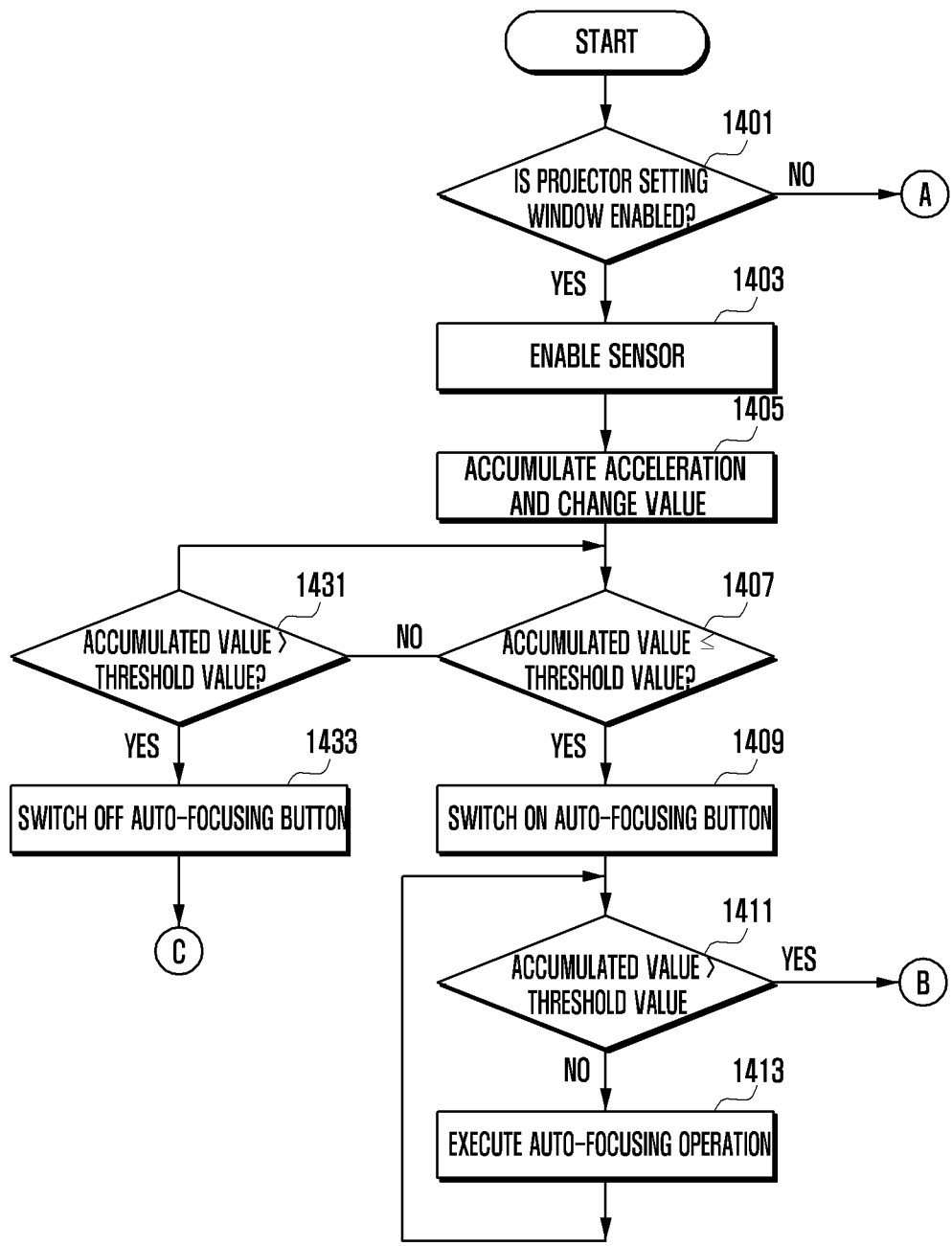
FIGS. 14A and 14B illustrate a procedure of controlling an auto-focusing operation of a projector in a portable terminal according to an embodiment of the present invention.
Figure 14B:
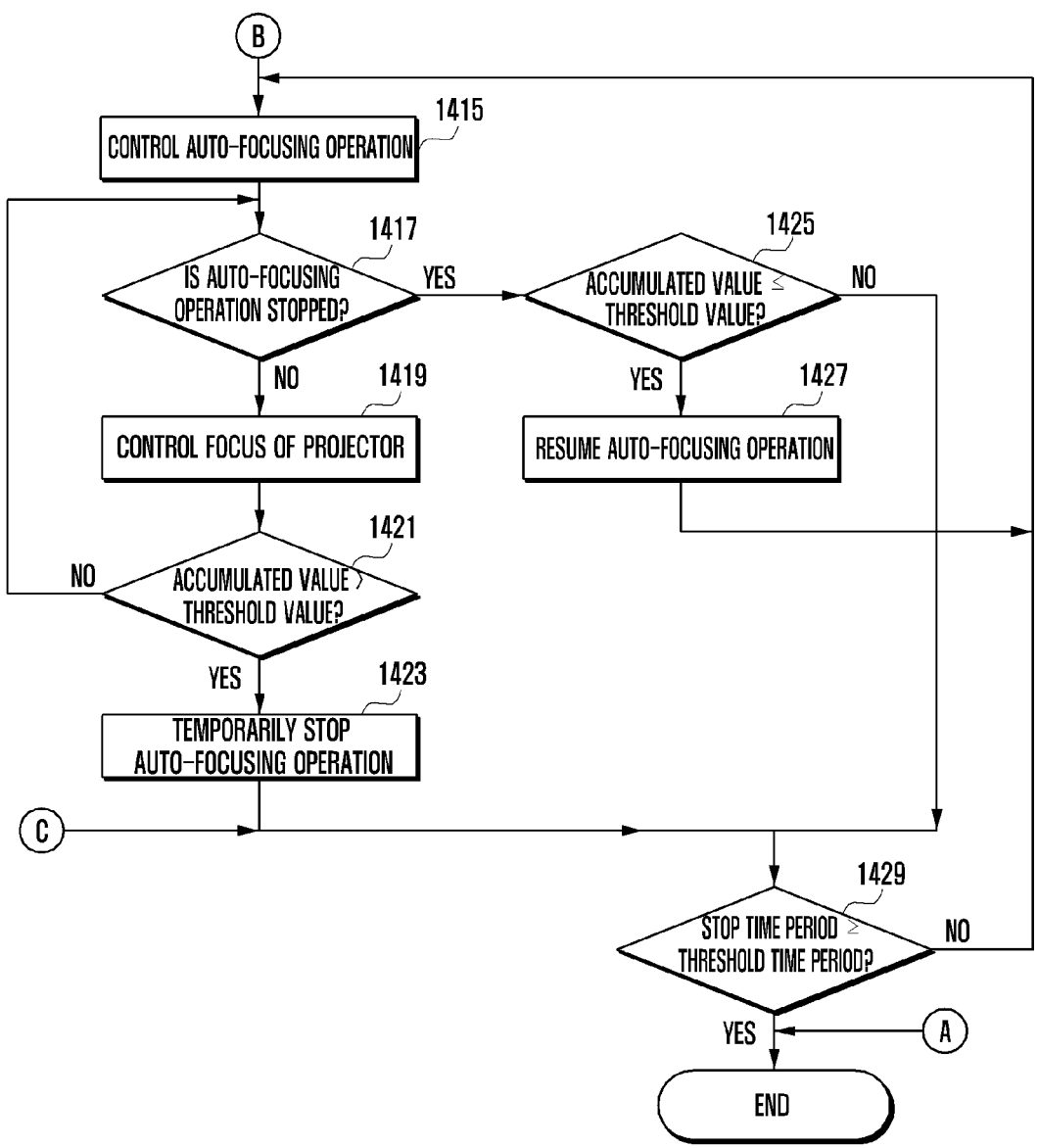

FIGS. 14A and 14B illustrate a procedure of controlling an auto-focusing operation of a projector in a portable terminal according to an embodiment of the present invention.

Referring to FIGS. 14A and 14B, when the projector setting window is enabled, the controller 160 detects the fact in step 1401. Then, the projector setting window may be enabled as the projector is enabled. As the projector setting window is enabled, the controller 160 determines the enabling of the sensor unit 150 in step 1403. The sensor includes an acceleration sensor 152 and an optical sensor 151. The controller 160 detects motion or shaking through the acceleration sensor 152, and detects a change in ambient light through the optical sensor 151. Thereafter, the controller 160 calculates the acceleration and the change in light and accumulates the calculated value in step 1405. The controller 160 compares the accumulated value with a preset threshold value. The threshold value may be a value equal to or less than a threshold value for controlling a state (ON/OFF) of the auto-focusing button. After the preset threshold value is detected by the sensor unit 150, and when the preset threshold value is neither equal to nor greater than the calculated and accumulated value, the controller 160 determines whether the preset threshold value is equal to or less than an accumulated value in step 1431. When the threshold value is equal to or less than the accumulated value, the control unit 160 switches off the auto-focusing button and does not execute the auto-focusing function.

When the preset threshold value is equal to or greater than the accumulated value, the controller 160 detects the fact in step 1407. The controller 160 switches on the auto-focusing button in step 1407, and executes an auto-focusing function.

Thereafter, the controller 160 detects a motion and a change in light through the sensor unit 150 during execution of the auto-focusing function, and calculates and accumulates the detected value. Thereafter, the controller 160 compares the accumulated value with a preset threshold value in step 1411. The threshold value may be equal to or less than a threshold value for controlling switching on of the auto-focusing button, and may be for determining whether an auto-focusing operation is to be executed or stopped.

When the accumulated acceleration value is greater than the threshold value, the controller 160 detects the fact in step 1411 and executes the auto-focusing operation in step 1413. The auto-focusing operation may be performed through the process of FIG. 10. The following process is connected to FIG. 14B, and will be understood with reference to FIG. 14B.

When the accumulated value is equal to or less than the preset threshold value, the controller 160 controls the auto-focusing operation in step 1415. Then, during the auto-focusing operation, the controller 160 controls stop of the auto-focusing operation.

When the auto-focusing operation is stopped, the controller 160 detects the fact in step 1417 and stops the auto-focusing operation. When the auto-focusing operation is not stopped, the controller 160 continuously accumulates a value detected by the sensor unit 150. The controller 160 continues the process of calculating and accumulating the detected value. the controller 160 compares an accumulated value calculated by the sensor unit 150 and a preset threshold value in step 1425. When the accumulated value is equal to or less than the threshold value, the controller 160 resumes the auto-focusing operation in step 1427 and proceeds to the steps before step 1415. The threshold value may be less than a threshold value for controlling an auto-focusing operation.

When the auto-focusing operation is not stopped, the controller 160 detects the fact in step 1419 and controls the focus of the projector 130 in step 1419. While the focus of the projector 130 is controlled, the controller 160 continuously accumulates a value detected by the sensor unit 150. The controller 160 continues the process of calculating and accumulating the detected value. When the accumulated acceleration value is greater than the threshold value, the controller 160 detects the fact in step 1421 and temporarily stops the auto-focusing operation in step 1423. Thereafter, the controller 160 determines whether the time period for which the auto-focusing operation is temporarily stopped is equal to or greater than a predetermined time period in step 1429. When the time period for which the auto-focusing operation is temporarily stopped is equal to or greater than a predetermined time period, the controller 160 stops the auto-focusing operation. When the time period for which the auto-focusing operation is temporarily stopped is less than the predetermined time period, the controller 160 proceeds to the steps before step 1415, and performs an auto-focusing operation.

In the above embodiment, the controller 160 can maintain the enabled state of the camera in advance to increase auto-focusing speed when setting of the projector is enabled or disabled.

The embodiments disclosed in the present specifications and drawings were provided merely to readily describe and to help a thorough understanding of the present invention but not intended to limit the scope of the present invention. Therefore, it should be construed that all modifications or modified forms drawn by the technical idea of the present invention in addition to the embodiments disclosed herein are included in the scope of the present invention.

What is claimed is:

1. A method of controlling the focus of a projector of a portable terminal, the method comprising:

projecting screen data by enabling an auto-focusing operation of the projector;
capturing the projected screen data through a camera, and detecting a change of a value of the captured screen through a sensor; and
when the change of the value is greater than a preset threshold value, temporarily stopping the auto-focusing operation of the projector and projecting the screen data,
wherein projecting the screen data by enabling the auto-focusing operation comprises:
when the screen data is projected, enabling the camera in a background;
recognizing a focusing area of the screen data projected through the camera;
calculating and displaying an optimum focus of the focusing area; and
after the optimum focus of the focusing area is calculated, synchronously setting a backlash compensating focusing value and projecting clear screen data.

2. The method of claim 1, wherein temporarily stopping the auto-focusing operation of the projector and projecting the screen data further comprises:
if a change of the value of the screen in a time period set while the auto-focusing operation is temporarily stopped is less than a second preset threshold value, enabling the auto-focusing operation of the projector and projecting screen data; and
when the time period for which the auto-focusing operation is temporarily stopped is greater than a set time period, completing the auto-focusing operation.

3. The method of claim 2, wherein the sensor is an acceleration sensor for detecting a change of the value of a motion of the screen, and
wherein temporarily stopping the auto-focusing operation of the projector and projecting the screen data comprises:
when the change of the value of the motion of the screen is greater than a preset threshold value, temporarily stopping the auto-focusing operation of the projector and projecting the screen data.

4. The method of claim 3, wherein temporarily stopping the auto-focusing operation of the projector and projecting the screen data further comprises:
if a change of the value of the motion of the screen in a time period set while the auto-focusing operation is temporarily stopped is less than a second preset threshold value, enabling the auto-focusing operation of the projector; and
when a time period for which the auto-focusing operation is temporarily stopped is greater than a set time, completing the auto-focusing operation.

5. The method of claim 2, wherein the sensor is an optical sensor for detecting a change of the value of ambient light,
and wherein temporarily stopping the auto-focusing operation of the projector and projecting the screen data comprises:
if a change of the value of a brightness of the screen is greater than a preset threshold value, temporarily stopping the auto-focusing operation of the projector and projecting the screen data.

6. The method of claim 5, wherein temporarily stopping the auto-focusing operation of the projector and projecting the screen data further comprises:
if a change of the value of the brightness of the screen in a time period set while the auto-focusing operation is temporarily stopped is less than a second preset threshold value, enabling the auto-focusing operation of the projector; and when a time period for which the auto-focusing operation is temporarily stopped is greater than a set time, completing the auto-focusing operation.

7. The method of claim 2, wherein the sensor comprises an acceleration sensor for detecting a change of the value of a motion of the screen and an optical sensor for detecting a change of the value of ambient light, and wherein temporarily stopping the auto-focusing operation of the projector and projecting the screen data comprises:

analyzing a change of the value of the screen detected by the acceleration sensor and the optical sensor;

if it is determined in the analysis process that the change of the value of the motion of the screen is greater than a preset threshold value, temporarily stopping the auto-focusing operation of the projector and projecting the screen data; and if it is determined in the analysis process that a change of the value of a brightness of the screen is greater than a preset threshold value, temporarily stopping the auto-focusing operation of the projector and projecting the screen data.

8. The method of claim 1, wherein calculating and displaying the optimum focus of the focusing area further comprises:

scanning the focusing range, and wherein the scanning of the focusing range comprising:

setting a left value in the focusing area and projecting a focus pattern;

setting a right value in the focusing area and calculating and storing a contrast of the focusing value; and when the focusing value is a right value, completing projection of the focus pattern.

9. The method of claim 8, wherein calculating and storing of the contrast of the focusing value comprises:

calculating a focusing value of which a contrast is maximal as an optimum focus.

10. A method of controlling a focus of a projector of a portable terminal, the method comprising:

when the projector setting window is enabled, projecting screen data through the projector;

when the screen data is projected, capturing the screen data through a camera and detecting a change of a value of the captured screen through a sensor; and when the change of the value of the screen is greater than a preset threshold value, controlling a button by disabling an auto-focusing button and projecting the screen data.

11. The method of claim 10, wherein controlling the button by disabling an auto-focusing button and projecting the screen data further comprises:

when the change of the value of the screen is less than a second preset threshold value, projecting screen data by enabling the auto-focusing button and enabling an auto-focusing operation.

12. An apparatus for controlling a focus of a projector of a portable terminal, the apparatus comprising:

a projector that projects screen data;

a camera that, when the screen data is projected by the projector, captures the projected screen data;

a sensor unit that detects a change of a value of the screen captured by the camera; and a controller that, during execution of the projector, when the change of the value of the screen is greater than a preset threshold value, projects the screen data by temporarily stopping an auto-focusing operation of the projector, and when the change of the value of the screen is less than a second preset threshold value, projecting the screen data by enabling an auto-focusing operation of the projector.

13. The apparatus of claim 12, wherein the controller completes the auto-focusing operation when a time period, for which the auto-focusing operation is temporarily stopped, is greater than a preset time period.

14. The apparatus of claim 12, wherein the sensor unit comprises an acceleration sensor and an optical sensor to detect a change of the value of a motion of the captured screen and a change of the value of light.

15. The apparatus of claim 14, wherein the controller objects screen data by temporarily stopping the auto-focusing operation of the projector when the change of the value of the motion detected by the acceleration sensor is greater than a preset threshold value, and enables the auto-focusing operation of the projector when the change of the value of the motion is less than a second preset threshold value, and completes the auto-focusing operation when the time period for which the auto-focusing operation is temporarily stopped is greater than a preset time period.

16. The apparatus of claim 14, wherein the controller projects screen data by temporarily stopping the auto-focusing operation of the projector when the change of the value of the light detected by the optical sensor is greater than a preset threshold value, and enables the auto-focusing operation of the projector when the change of the value of the light is less than a second preset threshold value, and completes the auto-focusing operation when the time period for which the auto-focusing operation is temporarily stopped is greater than a preset time period.

17. The apparatus of claim 12, wherein the controller, during the auto-focusing operation, recognizes a focusing area of the screen data projected by the camera, calculates an optimum focus in the focusing area, and projects clear screen data by asynchronously setting a backlash compensating focusing value.

18. The apparatus of claim 17, wherein the controller scans a focusing range to calculate the optimum focus, projects a focus pattern by setting a left value in the focusing area during the scanning of the focusing range, calculates and stores a contrast of the focusing value by setting a right value in the focusing area, and completes projection of the focus pattern when the focusing value is a right value.

19. The apparatus of claim 18, wherein the controller calculates a focusing value of which a contrast is optimum when the contrast of the focusing value is calculated and stored.

20. The apparatus of claim 12, wherein the controller projects screen data through the projector when the projector setting window is enabled, captures the screen data through the camera when the screen data is projected, detects a change of the value of the screen through the sensor unit, projects screen data by disabling the auto-focusing button when the change of the value of the screen is greater than a preset threshold value, and disables the auto-focusing operation to display the screen data when the change of the value of the screen is less than a second preset threshold value.

* * * * *